(12) United States Patent
Hill et al.

(10) Patent No.: US 9,380,341 B2
(45) Date of Patent: Jun. 28, 2016

(54) METHOD AND SYSTEM FOR A PROGRAM GUIDE

(71) Applicant: THOMSON LICENSING, Issy de Moulineaux (FR)

(72) Inventors: Daniel Joseph Hill, Los Angeles, CA (US); Laura O'Donnell, Los Angeles, CA (US); Clayton Alexander Thomson, Ventura, CA (US); Nicholas Edward Snodgrass, Los Angeles, CA (US); Roger Yeh, San Marino, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 267 days.

(21) Appl. No.: 13/929,029

(22) Filed: Jun. 27, 2013

(65) Prior Publication Data

US 2015/0003815 A1    Jan. 1, 2015

(51) Int. Cl.
*H04N 21/458* (2011.01)
*H04N 21/422* (2011.01)
*H04N 21/41* (2011.01)
*H04N 21/433* (2011.01)
*H04N 21/472* (2011.01)

(52) U.S. Cl.
CPC .......... *H04N 21/458* (2013.01); *H04N 21/4126* (2013.01); *H04N 21/42209* (2013.01); *H04N 21/42224* (2013.01); *H04N 21/4334* (2013.01); *H04N 21/47214* (2013.01)

(58) Field of Classification Search
CPC .......... H04N 21/2407; H04N 21/4126; H04N 21/4227; H04N 21/434; H04N 21/4222; H04N 21/458; H04N 21/42209; H04N 21/42224; H04N 21/47214
See application file for complete search history.

(56) References Cited

U.S. PATENT DOCUMENTS

| 8,229,283 | B2* | 7/2012 | Ellis | 386/296 |
|---|---|---|---|---|
| 8,634,390 | B2* | 1/2014 | Ramakrishnan et al. | 370/338 |
| 2002/0174430 | A1* | 11/2002 | Ellis et al. | 725/46 |
| 2002/0174433 | A1* | 11/2002 | Baumgartner et al. | 725/58 |
| 2004/0218104 | A1* | 11/2004 | Smith et al. | 348/734 |
| 2010/0162316 | A1* | 6/2010 | Kim | 725/44 |
| 2010/0180298 | A1* | 7/2010 | Kim et al. | 725/39 |
| 2010/0222102 | A1* | 9/2010 | Rodriguez | 455/557 |
| 2010/0238109 | A1* | 9/2010 | Cook et al. | 345/156 |
| 2011/0273625 | A1* | 11/2011 | McMahon et al. | 348/734 |
| 2012/0210386 | A1* | 8/2012 | Kim et al. | 725/148 |
| 2012/0278840 | A1* | 11/2012 | Glennon | H04N 21/4314 725/56 |
| 2013/0283317 | A1* | 10/2013 | Guntupalli et al. | 725/44 |
| 2014/0007163 | A1* | 1/2014 | Johnson et al. | 725/43 |
| 2014/0068666 | A1* | 3/2014 | Moran et al. | 725/39 |

\* cited by examiner

*Primary Examiner* — Randy Flynn
(74) *Attorney, Agent, or Firm* — Brian J. Dorini; Lily Neff

(57) ABSTRACT

The disclosed embodiments relate to a system and method for a touchscreen device. The method includes presenting a program guide. The program guide includes a cell associated with a content item. The cell is selected in response to a first user input. The method also includes determining, in response to a second user input, a number of content occurrences of the content item to record based on a length of the second user input. The second user input includes a rightward movement. Additionally, the method includes scheduling the content item to be recorded for the number of content occurrences.

15 Claims, 9 Drawing Sheets

FIG. 2A

| | 7:00 | 7:30 | 8:00 | 8:30 | 9:00 | 9:30 |
|---|---|---|---|---|---|---|
| CH. A | Content Title | | Content Title | | | |
| CH. B | Program Y | | Content Title | | Content Title | |
| CH. C | Program X | Content Title | Content Title | Content Title | Content Title | Content Title |
| CH. D | Content Title | | | | Content Title | |

| | 7:00 | 7:30 | 8:00 | 8:30 | 9:00 | 9:30 |
|---|---|---|---|---|---|---|
| CH. A | Content Title | | Content Title | | | |
| CH. B | Prog | Program X on mm/dd/yyyy | Content Title | | Content Title | |
| CH. C | Prog X | Synopsis: The Crew puts on a play. | | Content Title | Content Title | Content Title |
| CH. D | Content Title | 212 | | | Content Title | |

|       | 7:00 | 7:30 | 8:00 | 8:30 | 9:00 | 9:30 |
|-------|------|------|------|------|------|------|
| CH. A | Content Title | | Content Title | | | |
| CH. B | Content Title | | Content Title | | Content Title | |
| CH. C | Program X | Program Y Recording 1 Future Episode 216 | | Content Title | Content Title | Content Title |
| CH. D | Content Title | | | | Content Title | |

|       | 7:00 | 7:30 | 8:00 | 8:30 | 9:00 | 9:30 |
|-------|------|------|------|------|------|------|
| CH. A | Content Title | | Content Title | | | |
| CH. B | Content Title | | Content | | Content | |
| CH. C | Program X | Program Y - Recording 2 Future Episods 216 | | | | Content Title |
| CH. D | Content Title | | | | Title | |

|  | 7:00 | 7:30 | 8:00 | 8:30 | 9:00 | 9:30 |
|---|---|---|---|---|---|---|
| CH. A | Content Title | | Content Title | | | |
| CH. B | Content Title Program X | Program X On mm/dd/yyyy Synopsis: The Crew Puts on a Play. Starring: Actor A Actor B  218 | Content Title | | Content Title | |
| CH. C | | | Content Title | Content Title | Content Title | Content Title |
| CH. D | Content Title | | | | Content Title | |

|  | 7:00 | 7:30 | 8:00 | 8:30 | 9:00 | 9:30 |
|---|---|---|---|---|---|---|
| CH. A | Content Title | | Content Title | | | |
| CH. B | Content Title Program X | Program X On mm/dd/yyyy Synopsis: The Crew Puts on a Play. Starring: Actor A Actor B  Directed by: Director Name  220 | Content Title | | Content Title | |
| CH. C | | | Content Title | Content Title | Content Title | Content Title |
| CH. D | Content Title | | | | Content Title | |

METHOD AND SYSTEM FOR A PROGRAM GUIDE

FIELD OF THE INVENTION

The present invention involves operating a multimedia device. More specifically, the present invention relates to a system for operating a multimedia device to use a program guide.

BACKGROUND OF THE INVENTION

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Home theater and entertainment systems provide content such as, movies, video games, or other multimedia experiences over a display device, such as a television. Further, the display device may be connected to a device that may include, but are not limited to, set-top boxes, streaming devices, smartphones, desktop computers, laptops, high-definition video disc players, and so on. Additionally, each of these devices may receive content from numerous content sources, including, but not limited to, cable, satellite, and Internet service providers.

Because of the wide variety of content options, many content providers have systems with electronic program guides for their users. Electronic program guides, also referred to herein as interactive program guides, present programming and scheduling information of the available content. Typically, an electronic program guide enables a user to scan through the available content by scrolling through program channels and program times. Additionally, electronic program guides enable users to select content for recording.

An improved system or method for using a program guide on a multimedia device is desirable.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for a program guide on a multimedia device. More specifically, there is provided a method to use a program guide. The method includes presenting a program guide. The program guide includes a cell associated with a content item. The cell is selected in response to a first user input. The method also includes determining, in response to a second user input, a number of episodes of the content item to record based on a length of the second user input. The second user input includes a rightward movement. Additionally, the method includes scheduling the content item to be recorded for the number of episodes.

BRIEF DESCRIPTION OF THE DRAWINGS

Advantages of the invention may become apparent upon reading the following detailed description and upon reference to the drawings in which:

FIGS. 2A-2I are simplified block diagram of exemplary program guides in accordance with the present disclosure;

Figure 1:
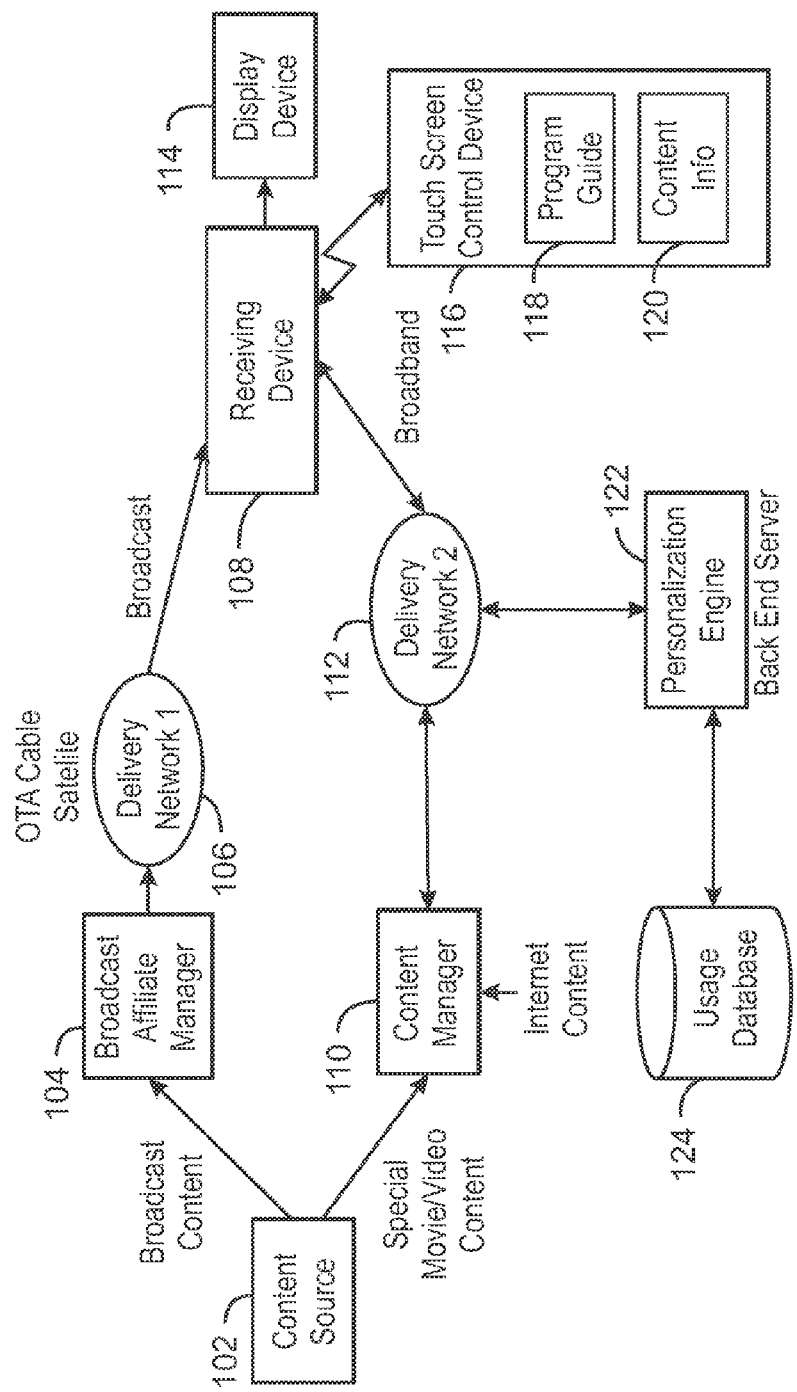
FIG. 1 is a block diagram of an exemplary system for providing recommendations in accordance with the present disclosure.

It should be understood that the drawings are for purposes of illustrating the concepts of the disclosure. The drawings are not necessarily the only possible configuration for illustrating the disclosure.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking for those of ordinary skill having the benefit of this disclosure.

The elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The proposed disclosure is directed towards using a program guide of content available for presentation on a touch screen device. A simple user navigation interface enables a user to navigate through the guide, and interact with cells in the program guide. The cells in the program guide represent individual content items, such as television programming, music, games, and the like. Interacting with individual cells enables the user to watch, listen to, and play: movies, music, and games, for example. Additionally, the user may request and view information, record specific content items.

Episodes of the same titled television show, podcast, radio show, game, and the like is referred to as a content occurrence. For example, three episodes of the television show SEINFIELD are represent three content occurrences.

Turning now to FIG. 1, which is a block diagram of an exemplary system for using an interactive program guide in accordance with the present disclosure. The content originates from a content source 102, such as a movie studio or production house. The content may be supplied in at least one of two forms. One form may be a broadcast form of content. The broadcast content is provided to the broadcast affiliate manager 104, which is typically a broadcast service, such as a television broadcast service. The broadcast affiliate manager may collect and store the content, and may schedule delivery of the content over a delivery network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108. It is to be appreciated that the receiving device 108 can take many forms and may be embodied as a set top box, digital video recorder (DVR), personal video recorder (PVR), a gateway, a modem, etc. Further, the receiving device 108 may act as an entry point, or gateway, for a home network system that includes additional devices configured as either client or peer devices in the home network.

A second form of content is referred to as special content. Special content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device 108 over a separate delivery network, delivery network 2 (112). Delivery network 2 (112) may include high-speed broadband Internet type communications systems. It is noted that the content from the broadcast affiliate manager 104 may also be delivered using all or parts of delivery network 2 (112), and that content from the content manager 110 may be delivered using all or parts of delivery network 1 (106). In addition, the user may also obtain content directly from the Internet via delivery network 2 (112) without necessarily having the content managed by the content manager 110.

Several adaptations for using the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The receiving device 108 may receive different types of content from one or both of delivery network 1 and delivery network 2. The receiving device 108 processes the content, and provides a separation of the content based on user preferences and commands. The receiving device 108 may also include a storage device, such as a hard drive or optical disk drive, for recording and playing back audio and video content. Further details of the operation of the receiving device 108 and features associated with playing back stored content will be described below in relation to FIG. 4. The processed content is provided to a display device 114. The display device 114 may be a conventional 2-D type display or may alternatively be an advanced 3-D display.

The receiving device 108 may also be interfaced to a second screen such as a touch screen control device 116. The touch screen control device 116 may be adapted to provide user control for the receiving device 108 and the display device 114. The touch screen device 116 may also be capable of displaying video content. The video content may be graphics entries, such as user interface entries (as discussed below), or may be a portion of the video content that is delivered to the display device 114. The touch screen control device 116 may interface to receiving device 108 using any well-known signal transmission system, such as infra-red (IR) or radio frequency (RF) communications and may include standard protocols such as infra-red data association (IRDA) standard, Wi-Fi, Bluetooth and the like, or any other proprietary protocols.

Operations of touch screen control device 116 will be described in further detail below.

Optionally, receiving device 108 and touch screen control device 116 may be integrated into the same device. Examples of media devices with a touch screen include, but are not limited to, computers, laptops, wireless phones, cell phones, personal media players, MP3 players, personal digital assistants (PDAs), tablet devices, digital video recorders, gateways, and the like. For purposes of the specification, the term media device can encompass all of these types of devices.

The touch screen control device 116 includes a program guide 118 and content info 120. The program guide 118 is a user interface that presents programming and scheduling information for available content. Additionally, the program guide 118 enables a user to navigate through the program guide 118, and interact with individual cells in the program guide. The cells in the program guide 118 represent individual content items, such as television programming, music, movies, games, and the like. Interacting with individual cells enables the user to watch, listen to, and play: movies, music, and games, for example. Additional interactions include, but are not limited to, allowing the user to request and view information, and recording specific content items. Interactions are described in greater detail with respect to FIGS. 2-6.

The touch screen control device 116 may also include content information (info) 120. The content information 120 may include details related to specific content items. Example details for a movie may include names of directors, actors, and so on. Content information 120 may be derived from the content source 102, broadcast affiliate manager 104, the Internet, or other remotely connected computing devices. In one example embodiment, the content information 120 may be stored on the receiving device 108.

In the example of FIG. 1, the system 100 also includes a back end server 122 and a usage database 124. The back end server 122 includes a personalization engine that analyzes the usage habits of a user and makes recommendations based on those usage habits. The usage database 124 is where the usage habits for a user are monitored and information about such usage habits is stored. It is possible to use such user habit information to develop a profile for a user which is then used for recommending advertisements and programming. In some cases, the usage database 124 may be part of the back end server 122. In the present example, the back end server 122 (as well as the usage database 124) is connected to the system the system 100 and accessed through the delivery network 2 (112).

FIG. 2A is a simplified block diagram of an exemplary program guide 200A in accordance with the present disclosure. The program guide 200A shows a schedule for a number of content items 202. The program guide 200A includes the channel 204 and time 206 that each content item 202 is available. Example content items 208, 210 are titled, "PROGRAM X" and, "PROGRAM Y," respectively. According to the program guide 200A, programs X and Y are available on channel C, at 7:00 and 7:30, respectively.

In one embodiment, the program guide enables a user to gain additional information about individual content items 202 by holding their finger down on the content item 202. For example, FIG. 2B is a simplified block diagram of an exemplary program guide 200B in accordance with the present disclosure. In response to the user holding their finger down on Program X, basic information 212 about Program X is presented. The basic information 212 includes the title, the date, and a synopsis. It is noted that the basic information 212 is merely an example of information that may be presented. Other information may be shown instead of, or in addition to, the title, date, and synopsis.

Figures 2C, 2D, 2E:
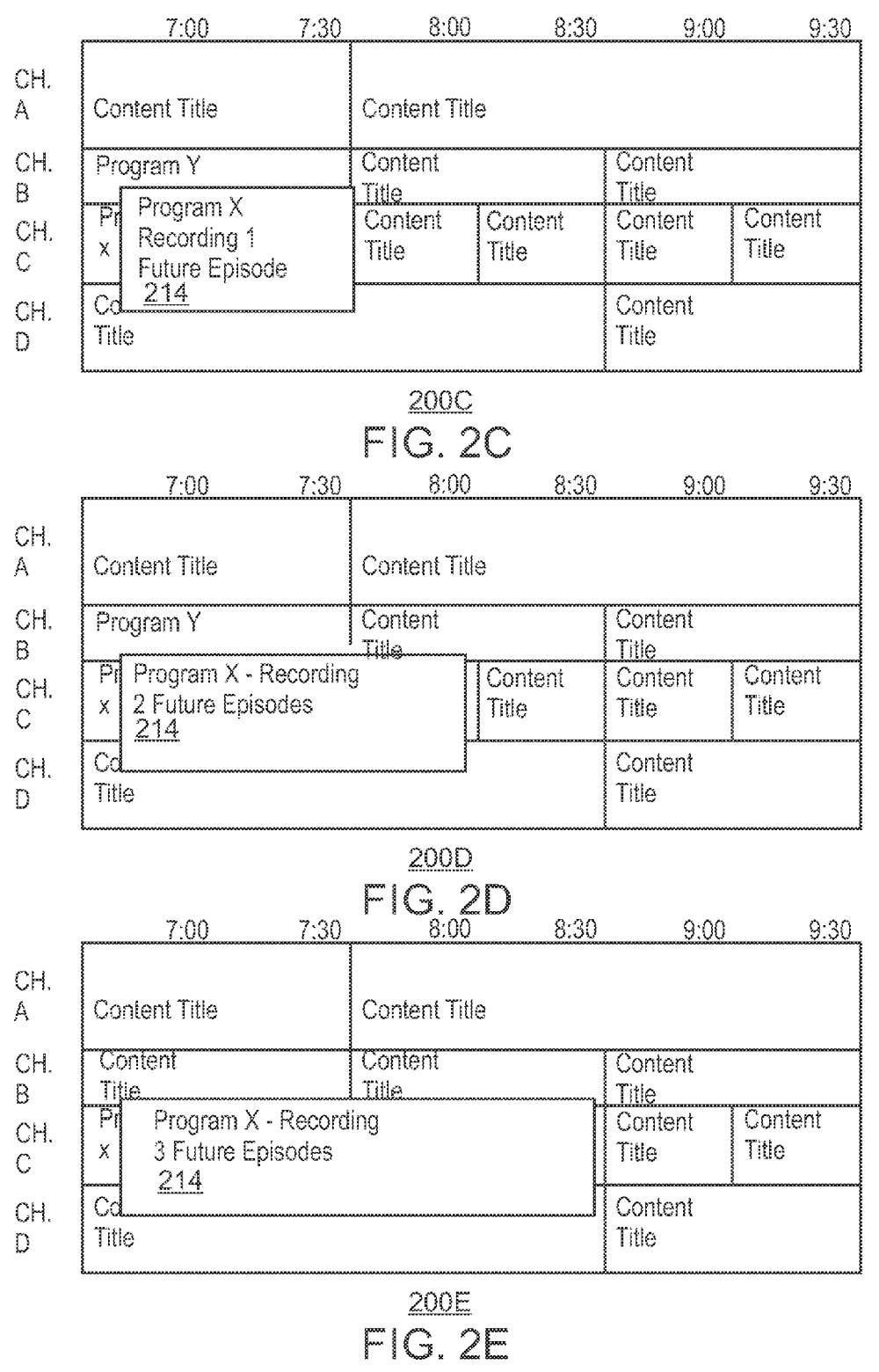

Additionally, the user may schedule a content item for recording. For example, FIG. 2C is a simplified block diagram of an exemplary program guide 200C in accordance with the present disclosure. In one embodiment, if the user drags their finger horizontally to the right, a new dialog box 214 is presented that sets up the number of future episodes of the selected content item 208 to be recorded. In one embodiment, the number of episodes to be recorded may be based on the length of the right finger drag. For example, by dragging the finger the same length as the width of the selected content item 208, one episode may be scheduled to be recorded.

Similarly, by dragging the finger the same length as two or three widths of the selected content item 208, two or three episodes may be schedules to be recorded, as shown in FIGS. 2D and 2E, respectively. As seen in FIGS. 2C through 2E, by dragging the finger the same length as two or three widths of the selected content item 208, the width of dialog box 214 will increase to approximately reflect the widths of the additional content items to be recorded. In one embodiment, the recordings comport to the time length of the content item to be recorded. For example, if the selected content item 210 is an hour in length, the number of episodes to be recorded comports to an hour block of the cells, as shown in FIGS. 2E and 2F.

Additionally, additional information may be presented about the selected content item 208, for example. In one embodiment, if the user drags the finger downwards in a vertical direction, more details about about the selected content item may be presented, as shown in dialog boxes 218, 220 of FIGS. 2H and 2I, respectively.

Figure 3:
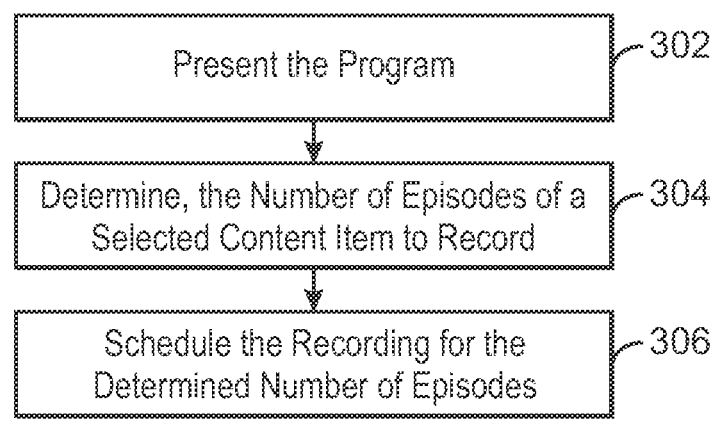
FIG. 3 is a flow chart of an exemplary method in accordance with the present disclosure.

FIG. 3 is a flow chart of an exemplary method 300 in accordance with the present disclosure. At block 302, a program guide is presented. The program guide includes cells for each available content item. Individual cells may be selected in response to user holding a finger down on the cell for a specified period of time.

As stated previously, if the user drags the finger rightward, the selected content item may be scheduled to be recorded. Accordingly, at block 304, the number of episodes to be recorded is determined. The number of episodes to be recorded is based on the length of the rightward movement and the width of the cell of the selected content item. At block 306, the selected content item is scheduled to be recorded for the determined number of episodes.

Figure 4:
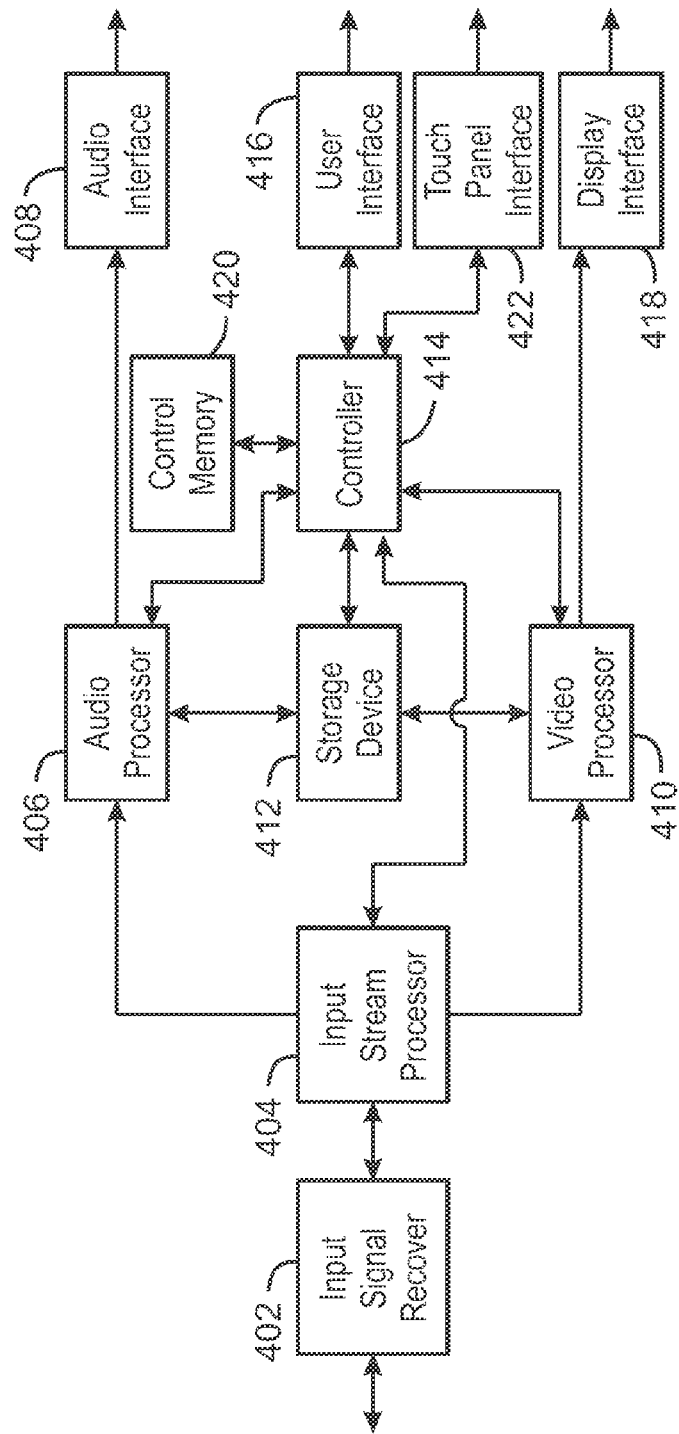
FIG. 4 is a block diagram of a receiving device in accordance with the present disclosure.

Turning now to FIG. 4, which is a block diagram of a receiving device 400 in accordance with the present disclosure. The receiving device 400 may include a set-top box, digital video recorder (DVR), or other device that operates similar to the receiving device 108 described in FIG. 1 and may be included as part of a gateway device, modem, set-top box, or other similar communications device. The device 400 shown may also be incorporated into other systems including an audio device or a display device. In either case, several components necessary for complete operation of the system are not shown in the interest of conciseness, as they are well known to those skilled in the art.

In the device 400 shown in FIG. 4, the content is received by an input signal receiver 402. The input signal receiver 402 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 402 based on user input provided through a control interface or touch panel interface 422. Touch panel interface 422 may include an interface for a touch screen device. Touch panel interface 422 may also be adapted to interface to a cellular phone, a tablet, a mouse, a high end remote or the like.

The decoded output signal is provided to an input stream processor 404. The input stream processor 404 performs the final signal selection and processing, and includes separation of video content from audio content for the content stream. The audio content is provided to an audio processor 406 for conversion from the received format, such as compressed digital signal, to an analog waveform signal. The analog waveform signal is provided to an audio interface 408 and further to the display device or audio amplifier. Alternatively, the audio interface 408 may provide a digital signal to an audio output device or display device using a High-Definition Multimedia Interface (HDMI) cable or alternate audio interface such as via a Sony/Philips Digital Interconnect Format (SPDIF). The audio interface may also include amplifiers for driving one more sets of speakers. The audio processor 406 also performs any necessary conversion for the storage of the audio signals.

The video output from the input stream processor 404 is provided to a video processor 410. The video signal may be one of several formats. The video processor 410 provides, as necessary a conversion of the video content, based on the input signal format. The video processor 410 also performs any necessary conversion for the storage of the video signals.

A storage device 412 stores audio and video content received at the input. The storage device 412 allows later retrieval and playback of the content under the control of a controller 414 and also based on commands, e.g., navigation instructions such as fast-forward (FF) and rewind (Rew), received from a user interface 416 and/or touch panel interface 422. The storage device 412 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 410, either originating from the input or from the storage device 412, is provided to the display interface 418. The display interface 418 further provides the display signal to a display device of the type described above. The display interface 418 may be an analog signal interface such as red-green-blue (RGB) or may be a digital interface such as HDMI. It is to be appreciated that the display interface 418 will generate the various screens for presenting the search results (e.g., in a three dimensional gird, two dimensional array, and/or a shelf as will be described in more detail below).

The controller 414 is interconnected via a bus to several of the components of the device 400, including the input stream processor 402, audio processor 406, video processor 410, storage device 412, and a user interface 416. The controller 414 manages the conversion process for converting the input stream signal into a signal for storage on the storage device or for display. The controller 414 also manages the retrieval and playback of stored content. Furthermore, as will be described below, the controller 414 performs searching of content and the creation and adjusting of the grid, array and/or shelf display representing the content, either stored or to be delivered via the delivery networks, described above.

The controller 414 is further coupled to control memory 420 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 414. Control memory 420 may store instructions for controller 414. Control memory may also store a database of elements, such as graphic elements containing content. The database may be stored as a pattern of graphic elements, such as graphic elements containing content, various graphic elements used for generating a displayable user interface for display interface 418, and the like. Alternatively, the memory may store the graphic elements in identified or grouped memory locations and use an access or location table to identify the memory locations for the various portions of information related to the graphic elements. Additional details related to the storage of the graphic elements will be described below. Further, the implementation of the control memory 420 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Optionally, controller 414 can be adapted to extract metadata, criteria, characteristics or the like from audio and video media by using audio processor 406 and video processor 410, respectively. That is, metadata, criteria, characteristics or the like that is contained in video signal in the vertical blanking interval, auxiliary data fields associated with video, or in other areas in the video signal can be harvested by using the video processor 410 with controller 414 as to generate metadata that can be used for functions such as generating an electronic program guide, have descriptive information about received video, supporting an auxiliary information service, and the like. Similarly, the audio processor 406 working with controller 414 can be adapted to recognize audio watermarks that may be in an audio signal. Such audio watermarks can then be used to perform some action such as the recognition of the audio signal, security which identifies the source of an audio signal, or perform some other service. Furthermore, metadata, criteria, characteristics or the like, to support the actions listed above can come from a network source which are processed by controller 414.

Figure 5:
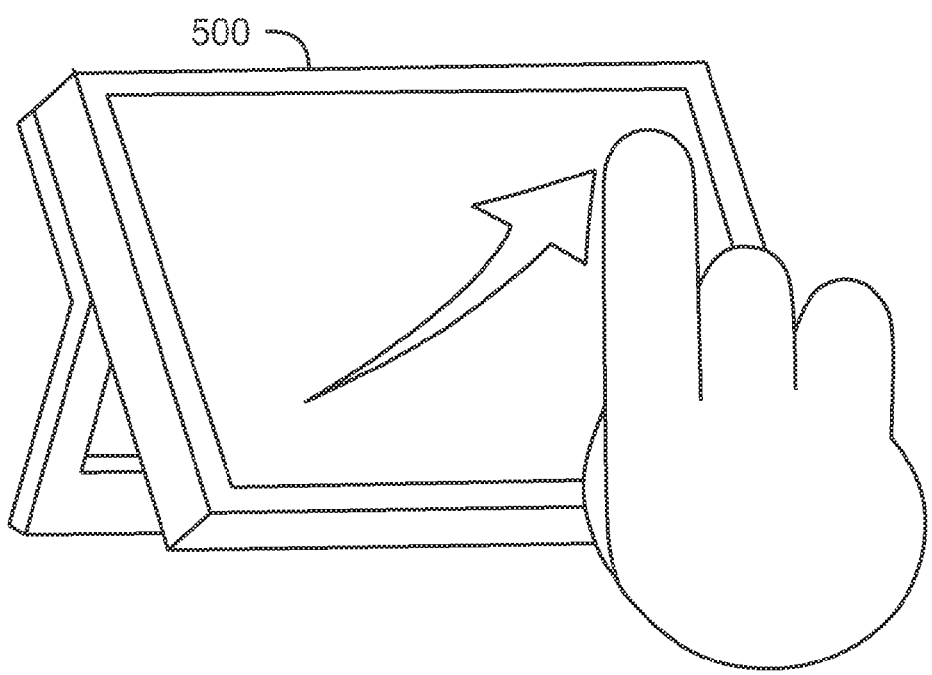
FIG. 5 is a perspective view of an exemplary touch panel device in accordance with the present disclosure.

Turning now to FIG. 5 is a perspective view of an exemplary touch panel device 500 in accordance with the present disclosure. The user interface process of the present disclosure employs an input device that can be used to express functions, such as described with reference to selecting the mood of the movies for recommendation. The device may include a controller, touch screen device, tablet, any other device as described with reference to the touch screen device 116 shown in FIG. 1, or any integrated examples of the receiving device 108 and touch screen device 116. The touch panel device 500 may be interfaced via the user interface 416 or touch panel interface 422 of the receiving device 400. The touch panel device 500 allows operation of the receiving device or set top box based on hand movements, or gestures, and actions translated through the panel into commands for the set top box or other control device. In one embodiment, the touch panel 500 may simply serve as a navigational tool to navigate the grid display. In other embodiments, the touch panel 500 will additionally serve as the display device allowing the user to more directly interact with the navigation through the grid display of content. The touch panel device may be included as part of a remote control device containing more conventional control functions such as activator and/or actuator buttons. The touch panel 500 can also include at least one camera element. As described above, the touch panel device 500 (or display device 114) may use a media asset discovery function to provide media recommendations to a user.

Figure 6:
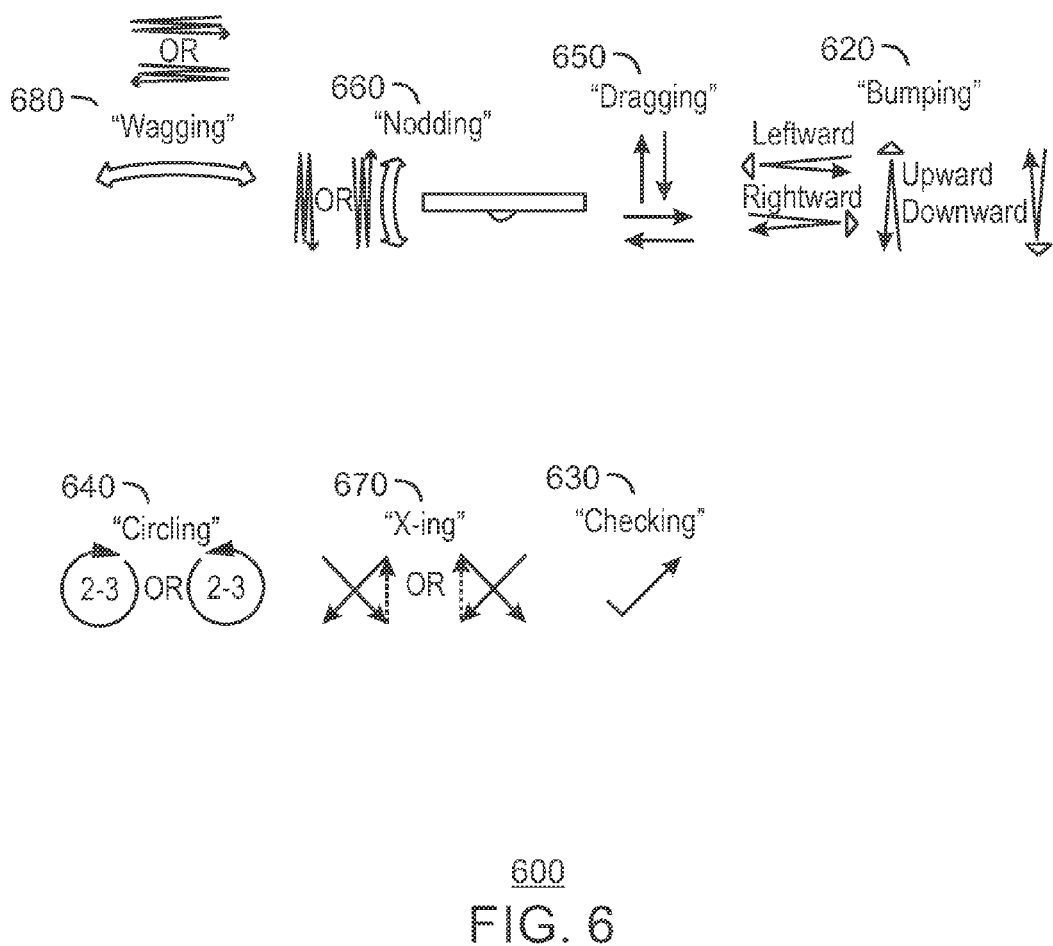
FIG. 6 is a diagram of exemplary gestures for a gesture sensing controller or touch screen interface in accordance with the present disclosure.

Turning now to FIG. 6, which is a diagram 600 of exemplary gestures for a gesture sensing controller or touch screen interface in accordance with the present disclosure. The use of a gesture sensing controller or touch screen, such as shown, provides for a number of types of user interaction. The inputs from the controller are used to define gestures and the gestures, in turn, define specific contextual commands. The configuration of the sensors (e.g., touch screen sensor and/or inertial sensors such as accelerometer and gyroscope sensors) may permit defining movement of a user's fingers on a touch screen or may even permit defining the movement of the controller itself in either one dimension or two dimensions. Two-dimensional motion, such as a diagonal, and a combination of yaw, pitch and roll can be used to define any three-dimensional motion, such as a swing. A number of gestures are illustrated in FIG. 6. Gestures are interpreted in context and are identified by defined movements made by the user.

Bumping 620 is defined by a two-stroke drawing indicating pointing in one direction, either up, down, left or right. The bumping gesture is associated with specific commands in context. For example, in a TimeShifting mode, a left-bump gesture 620 indicates rewinding, and a right-bump gesture indicates fast-forwarding. In other contexts, a bump gesture 620 is interpreted to increment a particular value in the direction designated by the bump. Checking 640 is defined as in drawing a checkmark. It is similar to a downward bump gesture 620. Checking is identified in context to designate a reminder, user tag or to select an item or element. Circling 640 is defined as drawing a circle in either direction. It is possible that both directions could be distinguished. However, to avoid confusion, a circle is identified as a single command regardless of direction. Dragging 650 is defined as an angular movement of the controller (a change in pitch and/or yaw) while pressing a button (virtual or physical) on the tablet 500 (i.e., a "trigger drag"). The dragging gesture 650 may be used for navigation, speed, distance, time-shifting, rewinding, and forwarding. Dragging 650 can be used to move a cursor, a virtual cursor, or a change of state, such as highlighting outlining or selecting on the display. Dragging 650 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 660 is defined by two fast trigger-drag up-and-down vertical movements. Nodding 660 is used to indicate "Yes" or "Accept." X-ing 670 is defined as in drawing the letter "X." X-ing 670 is used for "Delete" or "Block" commands. Wagging 680 is defined by two trigger-drag fast back-and-forth horizontal movements. The wagging gesture 680 may be used to indicate "No" or "Cancel" or to move displayed or virtual objects (e.g. cursors) horizontally.

Depending on the complexity of the sensor system, only simple one dimensional motions or gestures may be allowed. For instance, a simple right or left movement on the sensor as shown here may produce a fast forward or rewind function. In addition, multiple sensors could be included and placed at different locations on the touch screen. For instance, a horizontal sensor for left and right movement may be placed in one spot and used for volume up/down, while a vertical sensor for up and down movement may be place in a different spot and used for channel up/down. In this way specific gesture mappings may be used.

Although embodiments which incorporate the teachings of the present disclosure have been shown and described in detail herein, those skilled in the art can readily devise many other varied embodiments that still incorporate these teachings. Having described preferred embodiments of a system, method and user interface for media asset recommendations (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

What is claimed is:

1. A method for a computing device, comprising:
presenting a program guide comprising a plurality of cells organized in at least one horizontal row, each cell having a predetermined width and associated with a content item, wherein a first cell is selected in response to a first user input;
determining, in response to a second user input, a number of content occurrences of the content item corresponding to the selected first cell to record based on a length of a rightward movement along a horizontal row that begins with the selected first cell, wherein the number of content occurrences of the content item to record is the number of widths of the selected first cell corresponding to the length of the rightward movement; and
scheduling the content item to be recorded for the number of content occurrences determined in response to the second user input.

2. The method of claim 1, comprising presenting, in response to the second user input, a message describing the number of content occurrences of the content item to be recorded.

3. The method of claim 1, wherein a specified device records the content item, and wherein the specified device is disposed in a location that is remote from the computing device.

4. The method of claim 1, comprising presenting information associated with the content item in response to a user selecting the selected first cell continuously for a specified period of time.

5. The method of claim 4, comprising presenting additional information associated with the content item in response to a third user input, wherein the third user input comprises a downward movement.

6. The method of claim 5, wherein the downward movement begins in association with the first selected cell.

7. The method of claim 2, wherein the first user input comprises a user touching the selected first cell and the second user input comprises a horizontal finger drag along the horizontal row, the computing device comprising a touchscreen device.

8. The method of claim 2, wherein the message describing the number of content occurrences of the content item to be recorded is disposed in a dialog box and the width of the dialog box increases to approximately reflect the widths of the selected first cell corresponding to the length of the rightward movement.

9. A computing device, comprising:
a display interface that:
presents a program guide comprising a plurality of cells organized in at least one horizontal row, the plurality of cells associated with a corresponding plurality of content items, each cell having a predetermined width, and wherein one of the content items is selected in response to a first user input by selecting a cell corresponding to the selected content item; and presents, in response to a second user input, a message describing a number of content occurrences of the selected content item to be recorded; and a controller that:

determines, in response to the second user input, a number of content occurrences of the selected content item to record based on a length of a rightward movement along a horizontal row that begins with the selected cell, wherein the number of content occurrences of the content item to record is the number of widths of the selected cell corresponding to the length of the rightward movement; and schedules the selected content item to be recorded for the number of content occurrences determined in response to the second user input.

10. The computing device of claim 9, comprising a touchscreen device that detects a user touching a finger on the selected cell corresponding to the selected content item for a specified period of time, and the display device presents information associated with the selected content item in response to the user touching the finger on the selected cell corresponding to the selected content item for the specified period of time.

11. The computing device of claim 10, configured to present additional information associated with the selected content item in response to a downward movement of the finger.

12. The computing device of claim 9, wherein a specified device records the content item, and wherein the specified device is disposed in a location that is remote from the computing device.

13. The computing device of claim 11, wherein the downward movement begins in association with the first selected cell.

14. The computing device of claim 9, wherein the message describing the number of content occurrences of the content item to be recorded is disposed in a dialog box and the width of the dialog box increases to approximately reflect the widths of the selected cell corresponding to the length of the rightward movement.

15. The computing device of claim 9, comprising a touchscreen device that detects the second user input, wherein the second user input is a horizontal finger drag along the horizontal row.

* * * * *